(12) United States Patent
Goodwin et al.

(10) Patent No.: US 8,902,835 B2
(45) Date of Patent: Dec. 2, 2014

(54) METHOD AND ARRANGEMENT FOR SCHEDULING CONTROL IN A TELECOMMUNICATION SYSTEM

(75) Inventors: Graham C. Goodwin, New South Wales (AU); Torbjörn Wigren, Uppsala (SE)

(73) Assignee: Telefonaktiebolaget L M Ericcson (publ), Stockholm (SE)

( * ) Notice: Subject to any disclaimer, the term of this patent is extended or adjusted under 35 U.S.C. 154(b) by 218 days.

(21) Appl. No.: 13/514,822

(22) PCT Filed: Dec. 11, 2009

(86) PCT No.: PCT/SE2009/051408
§ 371 (c)(1),
(2), (4) Date: Jun. 8, 2012

(87) PCT Pub. No.: WO2011/071430
PCT Pub. Date: Jun. 16, 2011

(65) Prior Publication Data
US 2012/0250649 A1    Oct. 4, 2012

(51) Int. Cl.
*H04W 4/00* (2009.01)
*H04W 72/12* (2009.01)

(52) U.S. Cl.
CPC ...... *H04W 72/1226* (2013.01); *H04W 72/1252* (2013.01)
USPC ........................................................ 370/329

(58) Field of Classification Search
CPC ..... H04L 47/824; H04L 63/10; H04W 28/02; H04W 72/12; H04B 17/009; H04B 17/042
See application file for complete search history.

(56) References Cited

U.S. PATENT DOCUMENTS 8,295,951 B2 * 10/2012 Crisalle et al. .................. 700/29
2004/0185786 A1 * 9/2004 Mirbaha et al. ............ 455/67.11

FOREIGN PATENT DOCUMENTS

| WO | 2006/038786 A1 | 4/2006 |
| WO | 2008/143562 A1 | 11/2008 |
| WO | 2009/136825 A1 | 11/2009 |

* cited by examiner

*Primary Examiner* — Chirag Shah
*Assistant Examiner* — Jenkey Van
(74) *Attorney, Agent, or Firm* — Murphy Bilak & Homiller PLLC

(57) ABSTRACT

In a method of uplink scheduling control in a telecommunication system comprising a node and a plurality of associated user equipment, performing the steps of identifying S10 scheduling loop output signals, scheduling loop input signals, and scheduling loop system states, determining S20 a dynamic space state model representative of a scheduling loop in said system, based on at least a subset of said identified scheduling loop output and input signals and said scheduling loop system states. Subsequently, measuring S30 and storing S40 at least a subset of said identified scheduling loop output signals and said identified scheduling loop input signals. Finally, controlling S50 the plurality of user equipment of said scheduling loop based on optimization of a criterion dependent of said determined dynamic space state model, said stored scheduling loop input signal, and said stored scheduling loop output signals.

15 Claims, 6 Drawing Sheets

METHOD AND ARRANGEMENT FOR SCHEDULING CONTROL IN A TELECOMMUNICATION SYSTEM

TECHNICAL FIELD

The present invention relates to telecommunication systems in general, specifically to scheduling control in such systems.

BACKGROUND

In many communication systems, scheduling of users is performed from the network side, and is therefore sometimes referred to as network-based multi-user scheduling. For example, in previous generation systems, scheduling normally worked as an operation unit in the network controller. With the development of HSPA (High Speed Packet Access) and similar modern systems, scheduling was relocated to Node B.

For example, HSPA is generally based on High Speed Downlink Packet Access (HSDPA) in the downlink and Enhanced Uplink (EUL) in the uplink. The Enhanced Uplink (EUL) is sometimes referred to as High Speed Uplink Packet Access (HSUPA).

HSDPA is an enhancement to WCDMA (Wideband Code Division Multiple Access) that provides a smooth evolutionary path to higher data rates. HSDPA is specified in 3GPP release 5, and includes additional transport and control channels such as High-Speed Downlink Shared Channel (HS-DSCH). EUL is specified in 3GPP release 6 and includes additional transport and control channels such as the Enhanced Dedicated Channel (E-DCH).

Implementation of HSDPA enables improvements in capacity and end-user perception by means of efficient sharing of common resources in the cell among many users, rapid adaptation of the transmission parameters to the instantaneous radio channel conditions; increased peak bit rates and reduced delays. Fast scheduling is a mechanism that selects which user(s) to transmit to in a given Transmission Time Interval (TTI). The packet scheduler is a key element in the design of a HSDPA system as it controls the allocation of the shared resources among the users and largely determines the overall behavior of the system. In fact, the scheduler decides which users to serve and, in close cooperation with the link adaptation mechanism, which modulation, power and how many codes should be used for each user. This produces the actual end-user bit rate and system capacity. The HS-DSCH downlink channel is shared between users using channel-dependent scheduling to take advantage of favorable channel conditions in order to make best user of the available radio resources.

As mentioned, scheduling typically involves allocating communication resources to users according to some priority order. The scheduling algorithm generally determines the priorities of the user by using one or more metrics. Delay factors and optionally other factors based on radio channel quality are normally user to grant scheduling priorities to the users. For example, in MMTel services, the delay in the wireless access network is an important metric. It is known that so-called delay-sensitive schedulers for the downlink can achieve rather good performance for MMTel services such as Voice over IP traffic.

Similarly, to HSDPA in the downlink, there is a packet scheduler for E-DCH in the uplink. However, unlike HSDPA where the scheduler and the transmission buffer(s) are located in Node B, the data to be transmitted resides in the user equipment for the uplink case. The scheduler will normally operate on a request-grant principle, where the user equipment (UE) requests permission to send data and the scheduler on the network side decides when and how many terminals will be allowed to do so. A request for transmission will normally contain data about the state of the transmission data buffer and the queue at the terminal side and its available power margin. The standard foresees two basic scheduling methods, namely, long-term grants are issued to several terminals that can send their data simultaneously using code multiplexing, while short-term grants on the other hand allow multiplexing of terminals in the time domain.

In particular, for the Enhanced Uplink, the scheduler controls when and at which data rate the UE is allowed to transmit. By increasing the transmission power, the UE can transmit at a higher data rate. However, the received power from a certain UE represents interference for other UE terminals. Hence, the "shared resource" for EUL is typically the amount of tolerable interference in the cell. To control the uplink interference, the scheduler at Node B will allocate the UE with a value grant that corresponds to a maximum data rate.

The scheduler needs information about the UE status. Naturally, the more detailed the information, the better the possibilities for the scheduler to make accurate and efficient decisions. In EUL, there are two mechanisms for transferring scheduling information from the UE to NodeB: out-band signaling and in-band signaling. Out-band signaling is done through a single so-called "happy bit" transmitted on the Enhanced Dedicated Physical Control Channel (E-DPCCH). In-band signaling provides more detailed information and is transmitted on the Enhanced Dedicated Physical Data Channel (E-DPDCH).

The scheduler function for the enhanced uplink schedules EUL traffic of multiple users. EUL serves as a counterpart to the high-speed downlink packed access service in the WCDMA downlink. Together, EUL and HSDPA provide the backbone for the mobile broadband offer for the WCDMA cellular system. The scheduler operates in a closed loop fashion, where transmission grants (control signals) are issued in response to transmission requests and air interface load (measurements). The 3GPP standard provides channels with certain associated capacity, range, and delay properties. Notably, the control loop is dynamic, with nonlinear constraints and plenty of discrete ranges of various states.

The main problem with the existing scheduler functionality is that it does not account properly for the complicated multi-input-multi-output properties of the control loop, in fact the scheduler is designed without consideration of modern and systematic control theory, a fact that can be expected to lead to sub-optimal performance.

Therefore, there is a need for improved scheduling.

SUMMARY

The present invention relates to scheduling control in a telecommunication system.

Especially, the present invention relates to an improved scheduling loop control for EUL.

In a method of uplink scheduling control in a telecommunication system comprising a node and a plurality of associated user equipment, performing the steps of identifying S10 scheduling loop output signals, scheduling loop input signals, and scheduling loop system states, determining S20 a dynamic space state model representative of a scheduling loop in said system, based on at least a subset of said identified scheduling loop output and input signals and said scheduling loop system states. Subsequently, measuring S30 and storing S40 at least a subset of said identified scheduling loop output signals and said identified scheduling loop input signals. Finally, controlling S50 the plurality of user equipment of said scheduling loop based on optimization of a criterion dependent of said determined dynamic space state model, said stored scheduling loop input signal, and said stored scheduling loop output signals.

Advantages of the present invention include
Enhanced cell capacity for EUL
Increased stability margins for EUL
Increased cell coverage for EUL
Improved cell stability control

BRIEF DESCRIPTION OF THE DRAWINGS

The invention, together with further objects and advantages thereof, may best be understood by referring to the following description taken together with the accompanying drawings, in which.

ABBREVIATIONS

DL DownLink
E-AGCH Enhanced-Access Grant CHannel
E-DPCCH Enhanced-Dedicated Physical Control Channel
E-DPDCH Enhanced-Dedicated Physical Data Channel
E-HICH Enhanced-Hybrid ARQ Indicator CHannel
E-RGCH Enhanced-Relative Grant CHannel
E-TFCI Enhanced-Transport Format Combination Identifier
EUL Enhanced UpLink
HSDPA High Speed Downlink Packet Access
HSPA High Speed Packet Access
HSUPA High Speed Uplink Packed Access
LQG Linear Quadratic Gaussian
MPC Model Predictive Control
RBS Radio Base Station
RLC Radio Link Controller
TTI Transmission Time Interval
UE User Equipment
UL UpLink
WCDMA Wideband Code Division Multiple Access

DETAILED DESCRIPTION

Figure 1:
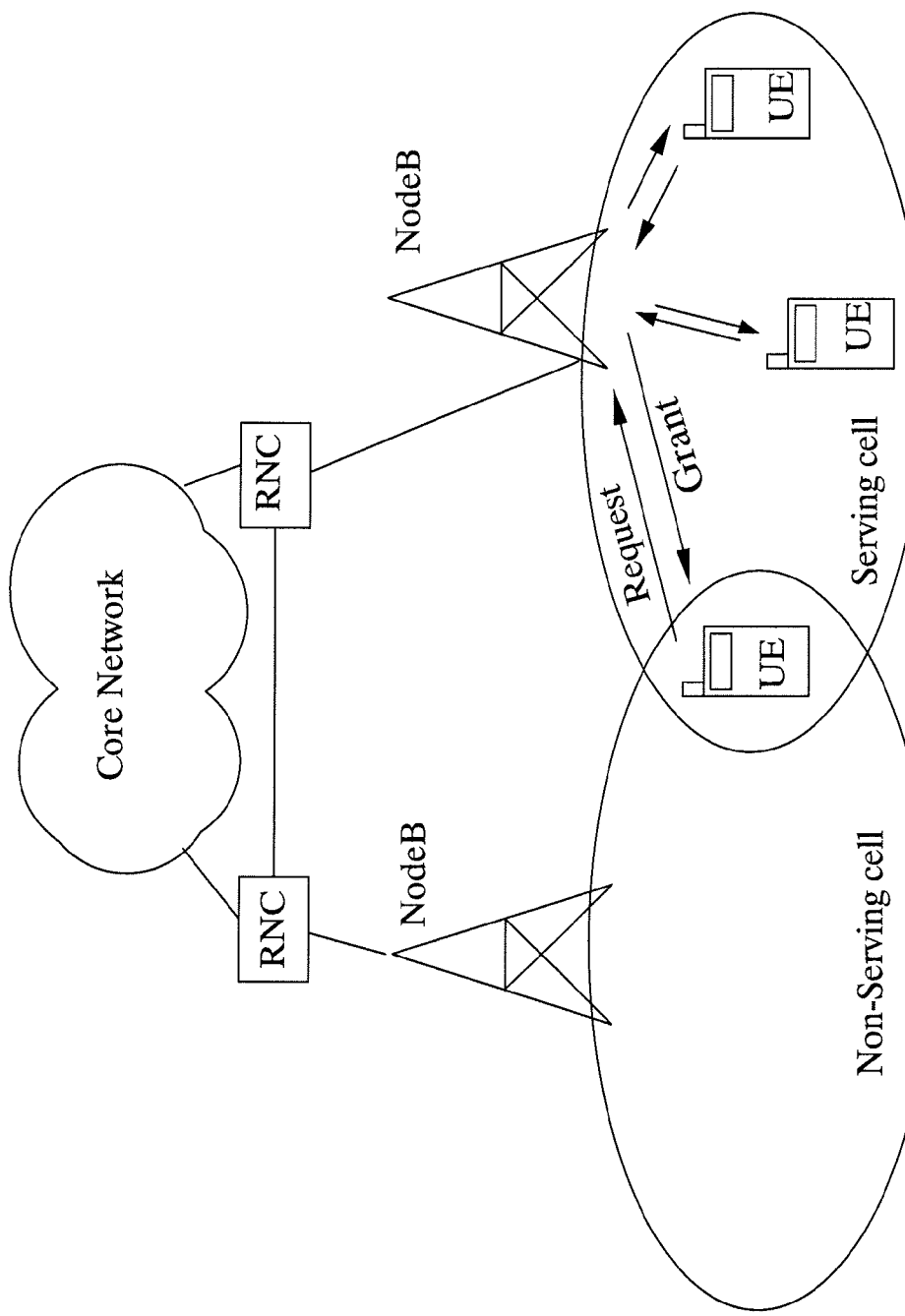
FIG. 1 is a schematic illustration of a telecommunication system in which the present invention can be implemented.

As an example, with reference to FIG. 1, the present invention will be described in the context of EUL. However, the same principles are applicable also for other systems such as uplink scheduling in the LTE system. With reference to FIG. 1, a telecommunication system includes a plurality of radio network controllers (RNC) in communication with a core network. Each RNC controls multiple of logical nodes Node B, and is responsible for call setup, quality of service handling and management of radio resources in the cells for which it is responsible. In addition, each RNC handles automatic retransmission requests (ARQ), retransmissions of erroneous data. Each Node B is responsible for physical layer processing such as error-correcting coding, modulation, and spreading, as well as conversion from the baseband to the radio-frequency signal transmitted from the antenna. A Node B is responsible for transmission and reception in one or several cells. Finally, each Node B supports one or more user equipments (UE) within its cell coverage.

In order for the reader to appreciate the benefits and specifics of the present invention, a detailed discussion about present day scheduling and its problems will be provided below.

Figure 2:
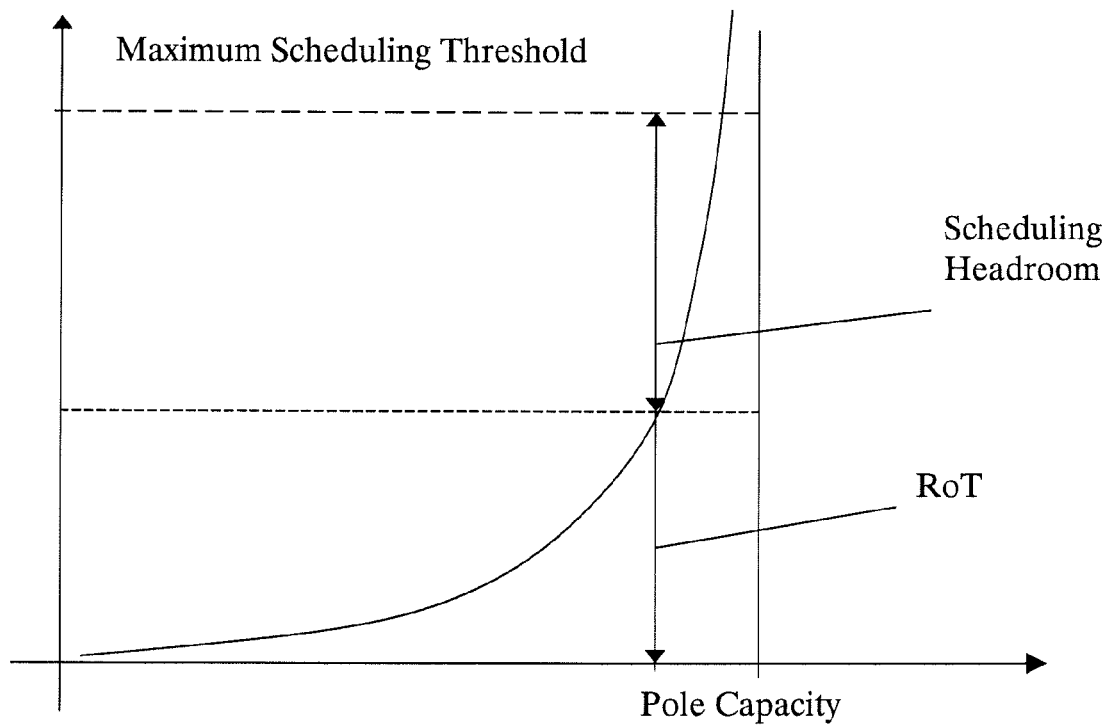
FIG. 2 is a graph illustrative of rise over thermal.

The WCDMA enhanced uplink aims at scheduling traffic to times when the uplink interference situation is favorable, thereby utilizing air interface resources in a better way than before. The air interface load is typically measured by the noise rise, over the thermal level, a quantity denoted rise over thermal (RoT). This idea is illustrated in FIG. 2. The pole capacity is the limiting theoretical bit rate of the uplink, corresponding to an infinite noise rise.

As mentioned before, the uplink data channel is denoted E-DPDCH. This channel supports a high rate. It is however not involved in the scheduling control as such, this is instead the task of the corresponding control channel, denoted E-DPCCH. This channel e.g. carries rate requests (measurement signals), from each user equipment to the EUL scheduler. There are also downlink channels supporting EUL. The first of these is the E-AGCH channel that carries absolute grants (control signals) to each UE. This channel will be discussed at length in the detailed description of the invention. More peripheral is the E-RGCH channel that carries relative grants (also control signals) from the node B to the UE. Finally, the E-HICH channel carries ACK/NACK information and is not directly involved in scheduling as such.

The grants mentioned above are the quantities signaled to each UE indicating what rate (actually power) it may use for its transmission. The UE can, but need not, use its complete grant. Relative grants are used to control the interference in neighbor cells—these can only decrease the current grant of the UE one step at a time. It is stressed that there are only a discrete number of grant levels that can be used.

For the interested reader, more details concerning EUL are e.g. available in [1]

The task of the scheduler, as mentioned previously, in each Node B is to schedule EUL user traffic, to enhance user and cell capacity, at the same time as it performs a plurality of tasks. These tasks include, keeping track of the air interface cell load, avoiding over-scheduling that may cause cell instability and loss of coverage, and keeping track of other available traffic, like transport resources and hardware. In addition, the scheduler receives, measures and estimates quantities relevant for its scheduling operation, and transmits orders to UEs, primarily in the fin in of granted power/bitrates.

When doing this the scheduler needs to operate within the constraints induced by the 3GPP standard, these constraints being e.g.

Limited grant transmission capacity.
Grant transmission delays.
Grant step up rate limitations.
Quantization of grant commands and measured signals.
Standard limited UE status information.
Extensive use of coarsely quantized information.

State of the art schedulers are designed without a proper application of control theoretic design rules. In one known scheduling solution, UEs are e.g. given the maximum bit rate as long as there are resources available, in an order defined by a priority list. Then, in case of lack of resources, overload handling is invoked. This overload handling reduces the priority of the UE with the best grant to a very low priority, thereby resulting in switching in case of conflicting high rate users. Since there is a dead time until re-scheduling takes effect, this results in a loss of capacity. Other aspects include the fact that scheduling is based solely on air interface load taking effect, i.e. previous scheduling commands for other UEs are not used for prediction of air interface load, a fact that causes further losses.

As mention earlier, the UEs form an integral part of the scheduling control loop. In this aspect, it is not the data transfer on the E-DPDCH channel that is of interest. Rather it is the operation of the UE according to the 3GPP standard. Each UE performs according to the following. Receiving absolute grants on the E-AGCH channel (control signal). There are four of these channels, however only one absolute grant can be transmitted per TTI on each channel. Hence, queues are used, which result in time varying delays. UEs are also receiving relative grants on the E-RGCH channel (control signal). The relative grants can only reduce the scheduled grant of the UE by single steps. Additionally, these are used when forming the scheduled grant for the UE, this hence being based on the absolute and relative grants. The scheduled grant is the actual grant used by the UE for transmission. Further, each user equipment uses the absolute grants and the relative grants, for computation of the power to be used for data transmission. This is expressed using beta factors that are computed as nonlinear functions of the scheduled grant, accounting also for the absolute output power level of the UE. There is a delay associated with this process, from the reception of absolute and relative grants, until the beta factor is utilized for transmission. Obviously, each user equipment also transmits user data, in accordance with the computed beta factor.

In addition, each user equipment performs determination and signaling of the happy bit (measurement signal) to the scheduler of the RBS, resident in the Node B. If not happy the UE requests a higher bit rate, determination and signaling of scheduled information (measurement signal) to the scheduler of the RBS. The scheduled information is based on the amount of data in the RLC buffer, which allows the scheduler to make scheduling decisions for the UE, and determination and signaling of the transport format used (E-TFCI). This carries e.g. the actual beta factor applied by the UE, thereby supporting the load estimator that provides the scheduler with information of the current air-interface load.

According to the present 3GPP standard, UEs are typically divided into different categories depending on whether they support 10 ms TTIs (TTI is roughly the scheduling sampling period) only, or also 2 ms TTIs. Their maximal bit rates also affect the category of the UEs. The details appear in Table 1.

TABLE 1

User Equipment categories

| E-DCH category | Minimum SF | Support for 2 ms TTI | Peak Data Rate 10 ms TTI | Peak Data Rate 2 ms TTI |
|---|---|---|---|---|
| Category 1 | 1xSF4 | — | 0.73 Mbit/s | — |
| Category 2 | 2xSF4 | Y | 1.46 Mbit/s | 1.46 Mbit/s |
| Category 3 | 2xSF4 | — | 1.46 Mbit/s | — |
| Category 4 | 2xSF2 | Y | 2 Mbit/s | 2.9 Mbit/s |
| Category 5 | 2xSF2 | — | 2 Mbit/s | — |
| Category 6 | 2xSF4 + 2xSF2 | Y | 2 Mbit/s | 5.76 Mbit/s |

The essence of all control problems is as follows: one has a set of inputs (or variables that can be manipulated) that affect the future response of a system. The observed outputs (or process variables) depend upon the choice of input and another component, which is the response of the system to the environment (or disturbances). The "Control Problem" is thus to choose the input so that the total system response (due to the input and environment) is close to a desired response trajectory (or "set point" sequence). Consequently, the key ingredients of any successful control scenario are A method for estimating a current "state" of the system
  A model that allows one to predict a future response of the system beginning with a current state for a given input sequence. (The model captures the input and disturbance response).
  A method for inverting the model so that the future response is as close as possible to the given "set-point" sequence.

The model will usually involve delays. This implies that inputs applied at a given time do not have their effect until a later time. Thus, the model needs to be able to predict the response over the delay interval.

When the model is linear and all inputs are feasible, then the control problem is well studied and many solution strategies exist. However, in practice, models are typically nonlinear and the allowable set of inputs is constrained. In this case, the problem is extremely difficult.

One way of addressing the general nonlinear constrained problem is to translate it into an optimization problem as follows:

Let $\alpha_k$ denote the value of a variable '$\alpha$' at time instant k. The control problem can then be described as:

The system under consideration is represented by a model according to Equation (1).

$$x_{k+1} = f(x_k, u_{k-d}, \omega_k) \quad y_k = h(x_k, v_k) \tag{1}$$

where $x_k$, $u_k$, $\omega_k$, $y_k$, $v_k$, d denote the state, input, disturbance, output, measurement errors and delays, respectively.

The desired future behaviour of the system from the current time k to time k+N is represented by a cost function J according to Equation (2)

$$J = \sum_{\ell=k}^{k+N} E\{\Gamma(y_\ell, u_\ell, r_\ell)\} \tag{2}$$

where E denotes expected value and $\{r_l\}$ denotes the desired "set-point" sequence.

The constraints on the system input can be expressed as $$u_k \in U \tag{3}$$

where $U$ is an allowed set of inputs.

Thus, the control problem has been translated into the following optimization problem: minimize Equation (2) subject to the model Equation (1), and constraints (3).

Model predictive control (MPC) typically solves the above mentioned control problem over a fixed horizon N for a known initial state. Then, the first input, $u_k$, is applied. Next the state advances to $x_{k+1}$, and the optimization is repeated. This introduces a "rolling horizon" aspect to the problem. In addition, feedback is introduced if one measures (or estimates) the current state and uses that as the basis of the optimization problem.

In general, the MPC problem as described above is computationally difficult. Several simple cases have been well studied e.g.

For the case of LQG (Linear Quadratic Gaussian Control) the input is unconstrained (i.e. any input is feasible.) and the control problem can be expressed as Equation (4)

$$\Gamma(y_k, u_k, r_k) = (y_k - r_k)^T Q(y_k - r_k) + u_k^T R u_k \quad f(x_k, u_{k-d}, \omega_k) = A x_k + B u_{k-d} + \omega_k \quad h(x_k, v_k) = C x_k + v_k \tag{4}$$

where $\{\omega_k\}$, $\{v_k\}$ are independent and identically distributed zero mean Gaussian sequences with covariance $\overline{Q}$, $\overline{R}$ respectively. This problem has a simple closed form solution based on solving Riccati equations see e.g. [4].

For the case of linear deterministic MPC, it is assumed no disturbances or noise, a linear model, quadratic cost and constraints described by a set of linear inequalities. The optimization is then known to be a "Quadratic Program" and is easily solved, see e.g. [5].

The MPC version of the previously described scheduling problem is difficult because (i) the model is nonlinear, (ii) the delays are random, (iii) the cost function is non-quadratic, (iv) the disturbances are non-Gaussian and (v) the constraints are non-convex (e.g. they can include finite alphabet constraints to deal with quantization).

As indicated above, the overall problem with existing scheduling solutions for EUL in the RBS e.g. Node B is that the scheduling control loop is designed in an ad hoc manner, without respecting fundamental and existing principles for controller design. This leads to suboptimal performance in terms of cell capacity and may manifest itself in problems with stability.

In particular, and as identified by the inventors:

The scheduler algorithm is not based on a dynamic model that account for nonlinear effects, loop delays, constraints, quantization and the fact that there is much uncertainty in available measurements. Hence Effects of past scheduling decisions for UEs are not fully exploited when scheduling grants for UEs in subsequent TTIs. Prediction of the effects of the air interface load is e.g. not used.

Knowledge of constraints is not fully utilized when scheduling grants.

A proper design accounting for delays is not performed, a fact that manifests itself in an increased risk for instability, resulting in turn in reduced bandwidth and load thresholds.

The scheduler algorithm is designed in an ad hoc manner, rather than by application of dynamic optimization techniques that account for all effects listed above. Obviously, performance will be less than what is possible, leading to a reduced cell capacity for EUL.

The scheduler algorithm does not simultaneously consider the scheduling of multiple UEs, and the effects of previous scheduling decisions, this being a fact that slows down the scheduler and reduces the utilization of resources. Put otherwise, cashing of scheduled decisions is not supported.

As indicated above, the greedy algorithms applied may cause switching between high bit rate users. Since there are dead times before scheduling resources are released, the UE s may not utilize all scheduled grants at 100% of the time. This also wastes cell capacity.

The principle to schedule users to the maximum bitrate conflicts with statistical multiplexing principles and reduces cell capacity. This follows since UEs do not utilize their scheduled grant at all times. To avoid this it is sometimes better to schedule more users at lower bit rates. Then the statistical effects make it possible to use the fact that on average a certain percentage of the cell capacity is free, despite the fact that the sum of the maximal bit rate of all users may have reached the load limit of the cell. The scheduler can then over schedule the cell, similar to when aircrafts are deliberately overbooked. This is however not utilized in the present scheduler algorithms.

An aim of the present invention is therefore to provide a scheduling functionality, or more specifically, a scheduling control which takes the above mentioned problems into consideration to more efficiently utilize the radio resources e.g. air interface load.

The basic concept of the present invention comprises a definition of a joint dynamic model of the collected effects of the 3GPP standard and the constraints of the radio interface for all EUL UEs in the telecommunication system, e.g. within the range of the Node B. The dynamic model is then used for systematic design of an optimal scheduling control algorithm of MPC type, said MPC serving as a new and better EUL scheduling loop algorithm. The beneficial effects of the present invention include an increased utilization of resources that can be used to increase the cell capacity and/or the coverage of EUL cells.

Figure 3:
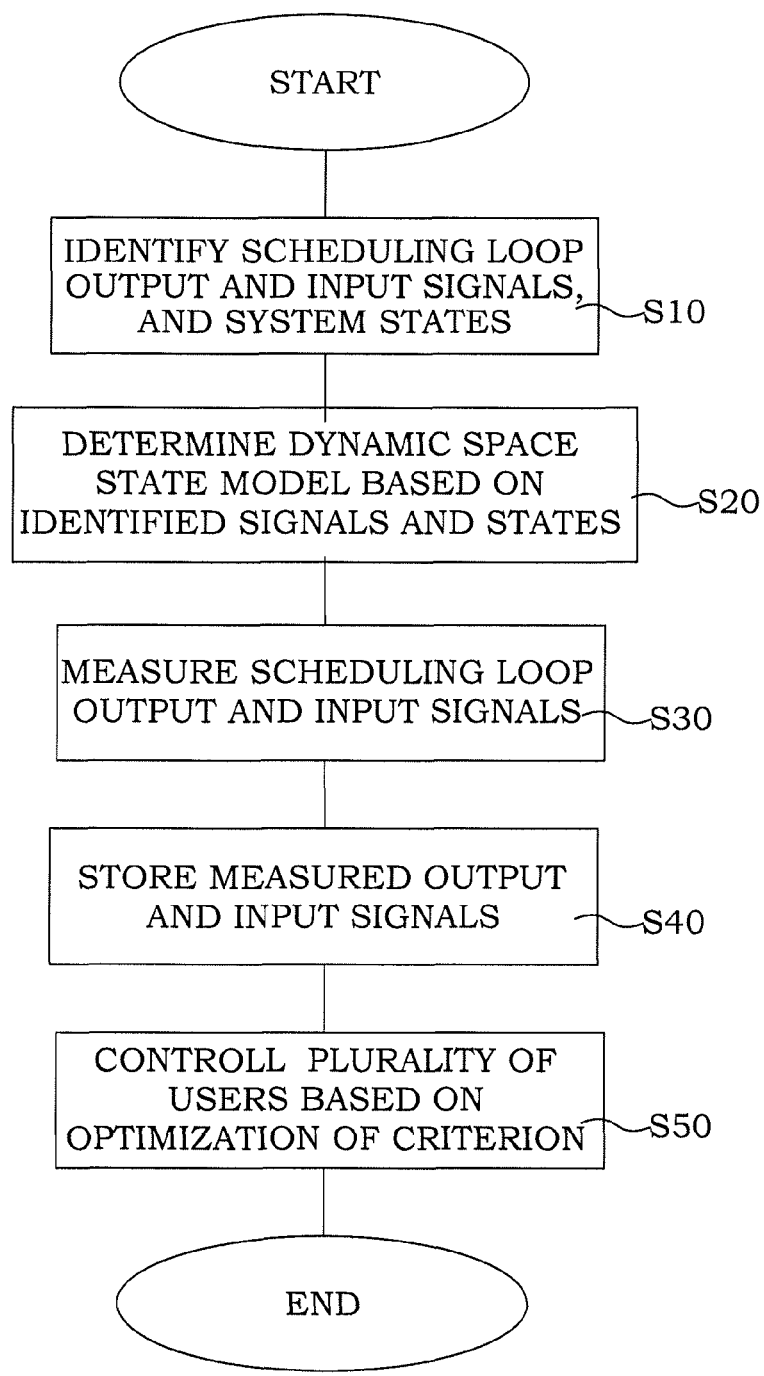
FIG. 3 is a schematic flow chart of an embodiment of a method according to the present invention.

A basic embodiment of the present invention will be described below, with reference to the flow chart of FIG. 3.

In a process of controlling a scheduling loop in a telecommunication system comprising at least a node e.g. Node B and a plurality of user equipment (UE) the following steps are performed. As a first step all relevant output, and input signals from/to the scheduling loop are identified S10, in the same step or in close cooperation with the step also the system states of the scheduling loop are determined. Subsequently, a dynamic space state model is determined S20 for the scheduling loop. The model can be viewed as a representation of the scheduling loop, which is determined based on at least a subset of the identified output/input signals and the determined system states. Then at least a subset of the identified output/input signals is measured S30 and stored S40, preferably within the Node B but also potentially in some other system node. Finally, the scheduling of the plurality of user equipment is controlled S50 based on optimization of a predetermined criterion which is dependent on the determined dynamic space state model together with the stored measured input and output signals.

Preferably, the optimization process comprises applying a model predictive control (MPC) process to the determined space state model.

In order to further describe and explain the benefits of the present invention with relation to MPC, a detailed description of the specifics of the invention will be described below.

In order to apply MPC to the EUL scheduling problem according to the present invention, it is necessary to quantify the properties of the system to control in a state space model. It is stressed that the modeling aims at quantifying the important aspects, excluding the actual scheduler. This is since the scheduler will be obtained as an optimal control algorithm that results from an application of a suitable MPC algorithm, utilizing the dynamic space state model of the system.

In order to determine the dynamic space state model it is first necessary to identify and define reference and input signals to the system (i.e. outputs from the controller e.g. scheduling loop or controller), measurement signals from the system (i.e. inputs to the e.g. scheduling loop or controller) and the states of the scheduling loop system. This is done in a next step. Note that the discussion is limited to controls that affect the air interface load. Hardware and transport resources are excluded from the discussion. Finally, it may be that only a subset of the quantities defined below are used for MPC.

Identifying Reference and Input Signals (Controls)

At last, the following reference and input signals affect the WCDMA EUL scheduling loop:

Absolute power grant reference (the end value after rate limited increase desired by the scheduler), denoted $r_{SC,i}^{A}(t) \in \{G_a^A\}_{a=1}^{NA}, i=1,\ldots,N$ where the subscript SC denotes the serving cell, i denotes the i:th UE, the superscript A denotes Absolute, and the components of the set are the quantized grant levels.

Absolute power grant control (the value sent to the UE during the rate limited increase)

$u_{SC,i}^{A}(t) \in \{G_a^A\}_{a=1}^{NA}, i=1,\ldots,N$

Relative power grant control $u_{SC,i,c}^{R}(t) \in \{G_r^R\}_{r=1}^{NR}, i=1,\ldots,N, c=1,\ldots,N_c$ where c denotes the neighbor cells for which the relative grant refers to.

Identifying Measurement Signals (Outputs)

The following measurement signals affect the scheduling loop:

Received scheduled/unscheduled uplink power/SIR (SIR=signal to interference ratio). Note that power and SIR can be computed from each other. The powers are denoted $y_{SC,i}^{P,Sc}(t), y_{SC,i}^{P,UnSc}(t)\ i=1,\ldots,N$ The superscript Sc denotes scheduled, and the superscript UnSc denotes standard traffic not scheduled by EUL.

Received total wideband power $y_{SC}^{RTWP}(t)$

Received scheduled enhanced uplink power shared (RSEPS, the sum of the powers of the enhanced uplink users)

$y_{SC}^{RSEPS}(t)$

Rise over thermal (RoT, the uplink load of the cell)

$y_{SC}^{RoT}(t)$

UE rate requests:
Happy bit (i.e. increase request if unhappy)

$y_{SC,i}^{H}(t) \in \{0,1\}, i=1,\ldots,N$ or scheduled information (remaining bytes in RLC buffer)

$y_{SC,i}^{Bytes}(t) \in \{B_b^{UE}\}_{b=1}^{NBytes}, i=1,\ldots,N$

Identifying System States

The states listed below are identified and utilized to describe the scheduling loop. Note that the states are sometimes very similar to the measurements defined above. The reason why states are introduced for the underlying true values is that various measurement errors, bit errors and other random uncertainties affect some of the measurements—the division between states and measurements then makes it possible to quantify the size and importance of the disturbance, this info illation being automatically exploited by MPC algorithms.

The serving grant (the actual granted air interface resources as seen in the UE)

$x_{SC,i}^{S}(t) \in \{G_s^S\}_{s=1}^{NS}, i=1,\ldots,N$

The superscript S denotes "serving".

The uplink cell load, i.e. the rise over thermal (RoT). This quantity denotes the true value of measured RoT.

$x_{SC}^{RoT}(t)$

Uplink powers/SIRs. These quantities denote the true values of the measured values obtained from the receiver.

$x_{SC,i}^{P,Sc}(t), x_{SC,i}^{P,UnSc}(t)\ i=1,\ldots,N$

Transmitted UE resources, as seen in the NB
Absolute grant $u_{SC,i}^{A,UE}(t), i=1,\ldots,N$ Relative grant $u_{SC,i,c}^{R,UE}(t), i=1,\ldots,N\ c=1,\ldots,N_c$ Rate requests, as seen in the UE
Happy bit $x_{SC,i}^{H}(t), i=1,\ldots,N$ Scheduled information $x_{SC,i}^{Bytes}(t), i=1,\ldots,N$ Load measures
Coverage $x_{SC}^{L,Coverage}(t)$ Stability $x_{SC}^{L,Stability}(t)$ Scheduled $x_{SC}^{L,Sc}(t)$ Unscheduled $x_{SC}^{L,UnSc}(t)$ Dynamics, Models, and Disturbances The next step according the present invention is to use the definitions above in order to write down the equations that describe the scheduling loop e.g. to determine the dynamic space state model of the scheduling loop. This is done for one UE, starting with the issued absolute grant reference and ending with measured results entering the scheduler algorithm The first dynamics to be described is the rate limited step up of the absolute grant, towards the reference value. This can be described according to Equation (5) below $$u_{SC,i}^{A}(t+1) = u_{SC,i}^{A}(t) + \Delta u_{SC,i}^{A}(t) = u_{SC,i}^{A}(t) + f^{A}(r_{SC,i}^{A}(t), u_{SC,i}^{A}(t)) \quad (5)$$

The function f is intended to describe the rate limitation. Now, only one absolute grant can be transmitted for each TTI on the E-AGCH channel. Therefore, a varying time delay may affect the transmitted grant to the UE, as seen in the Node B, i.e. Equation (6).

$$x_{SC,i}^{S}(t) = u_{SC,i}^{A,UE}(t - T^{A \to S}(\text{que, \# grants}, f^{A}(r_{sc,i}^{A}(t), u_{SC,i}^{A}(t)))) + \quad (6)$$

$$\sum_{c=1}^{N_c} u_{SC,i,c}^{R,UE}(t - T^{R}) + e_{SC,i}^{A,UE}(t) =$$

$$u_{SC,i}^{A,UE}(t - T^{A \to S}(t)) + \sum_{c=1}^{N_c} u_{SC,i,c}^{R,UE}(t - T^{R}) + e_{SC,i}^{A,UE}(t)$$

Note that the time delays depend on which of the four channels that is used and the number of grants in the queue. There are time delays for both the absolute and the relative grants. The error term is intended to model transmission errors from the Node B to the UE.

Next, the scheduled grant is transformed to a power ratio by the UE, using a nonlinear table. Further, back off is applied when the UE becomes close to its maximum transmission power. There is also a dead time before the UE starts transmitting after the scheduled grant is received. This gives the model according to (7).

$$k_{SC,i}^{P,Sc}(t) = \frac{\beta_{EDPCCH}^2(t, x_{SC,i}^S(t)) + n_{Codes}(t, x_{SC,i}^S(t))\beta_{EDPDCH}^2(t, x_{SC,i}^S(t))}{\beta_{DPCCH}^2(t)} \quad (7)$$

$$x_{SC,i}^{P,Sc}(t) = k_{SC,i}^{P,Sc}(t - T^{S \to P})x_{SC,DPCCH,i}^{P,Sc}(t),$$
$$i = 1, \ldots, N$$

The above models can be refined since the transmission resources are only used when there is data to send. The scheduled information is used for that purpose, resulting in Equation (8)

$$x_{SC,i}^{P,Sc}(t) = k_{SC,i}^{P,Sc}(t - T^{S \to P})x_{SC,DPCCH,i}^{P,Sc}(t)\text{sign}(x_{SC,i}^{Bytes}(t)), i = 1, \ldots, N \quad (8)$$

The rules that affect the transmission of rate requests are as follows. The UE sends "happy" in case the RLC buffer can be emptied within a specific time. Scheduled information is sent as long as the UE has RLC buffer contents to send. It should be noted that the Node B may receive "happy" even though the buffer never gets empty, due to the delays. This is a typical example where the cashing of scheduling decision offered by MPC may give benefits. For load estimation the starting point are the uplink load factor definition and the relation between C/I and SIR, given by Equations (9) and (10), $$L_i(t) = \frac{x_{SC,i}^P(t)}{I(t)} = \frac{x_{SC,i}^P(t)}{x_{SC,i}^P(t) + I(t) - x_{SC,i}^P(t)} \approx \frac{x_{SC,i}^P(t)/I(t)}{1 + x_{SC,i}^P(t)/I(t)} = \frac{(C/I)_{SC,i}(t)}{1 + (C/I)_{SC,i}(t)}, i = 1, \ldots, N \quad (9)$$

$$(C/I)_{SC,i}(t) = \frac{\beta_{DPCCH}^2(t) + n_{Codes}(t)\beta_{EDPDCH}^2(t) + \beta_{EDPCCH}^2(t)}{\beta_{DPCCH}^2(t)} \quad (10)$$
$$\frac{1}{SF_{DPCCH}}SIR_{SC,i}(t), i = 1, \ldots, N$$

In order to address the uplink cell load with respect to stability, the load due to all unscheduled traffic in the cell and without neighbor cell interference is of interest, to address the headroom for scheduled traffic. This is because as a first approximation it is only the power controlled channels of the own cell that may give rise to instability phenomena. Without going into details this load calculation can be described as Equation (11)

$$x_{SC}^{L,Stability}(t) = \sum_{\substack{i=1 \\ UnSc}}^{N} f^L(x_{SC,i}^{P,UnSc}(t - T^{Decode}), \beta_{DPCCH,i}(t), \beta_{DPDCH,i}(t)) \quad (11)$$

Note that the received power/SIR may need to be delayed to align with TFCI decoding.

The uplink load with respect to coverage also needs to be computed. Here the load due to unscheduled traffic and neighbor cell interference is of interest. Without going into details this load calculation can be described by Equation (12)

$$x_{SC}^{L,Coverage}(t) = \quad (12)$$
$$\sum_{\substack{i=1 \\ UnSc}}^{N} f^L(x_{SC,i}^{P,UnSc}(t - T^{Decode}), \beta_{DPCCH,i}(t), \beta_{DPDCH,i}(t)) +$$

$$x_{SC}^{L,Neighbors}(t)$$

The neighbor cell power can be related to the estimated RoT, thermal noise floor, and knowledge of the momentary scheduled and unscheduled loads. Using the RTWP and the definition of the total load, the following equation (13) results $$x_{SC}^{RTWP}(t - T^{Decode}) = (x_{SC}^{L,Sc}(t) + x_{SC}^{L,UnSc}(t) + x_{SC}^{L,Neighbor}(t))x_{SC}^{RTWP}(t - T^{Decode}) + x_{SC}^{NF}(t - T^{Decode}) \Leftrightarrow x_{SC}^{L,Neighbor}(t) = 1 - x_{SC}^{L,Sc}(t) - x_{SC}^{L,UnSc}(t) - (x_{SC}^{Rot}(t - T^{Decode}))^{-1} \quad (13)$$

This gives the result according to Equation (14)

$$x_{SC}^{L,Coverage}(t) = \quad (14)$$
$$1 - \sum_{\substack{i=1 \\ UnSc}}^{N} f^L(x_{SC,i}^{P,Sc}(t - T^{Decode}), \beta_{DPCCH,i}(t), \beta_{E-DPDCH,i}(t),$$
$$\beta_{E-DPCCH,i}(t)) - \frac{1}{x_{SC}^{Rot}(t - T^{Decode})}$$

The various methods for estimation of RoT is not discussed here, see for example [2], [3] for details.

Proceeding with measurement modeling, the following measurements may be subject to bit error effects:

The rate request measurements, as received in the Node B $$y_{SC,i}^H(t) = x_{SC,i}^H(t - T^{Encode} - T^{Decode}) + e_{SC,i}^H(t), i = 1, \ldots, N, e_{SC,i}^H(t) \in \{-1, 0, 1\}$$

$$y_{SC,i}^{Bytes}(t) = x_{SC,i}^{Bytes}(t - T^{Encode} - T^{Decode}) + e_{SC,i}^{Bytes}(t),$$
$$i = 1, \ldots, N, e_{SC,i}^{Bytes}(t) \in \{\ldots 3GPP \ldots\}$$

The grant measurements, as received in the UE, $$u_{SC,i}^{A,UE}(t) = u_{SC,i}^A(t) + e_{SC,i}^A(t), i = 1, \ldots, N,$$
$$e_{SC,i}^A(t) \in \{\ldots 3GPP \ldots\}$$

$$u_{SC,i,c}^{R,UE}(t) = u_{SC,i,c}^R(t) + e_{SC,i,c}^R(t), i, 1, \ldots, N, c = 1, \ldots, N_c, e_{SC,i,c}^R(t) \square \{\ldots 3GPP \ldots\}$$

Then there are Node B measurements that are subject to conventional measurement and estimation errors. These include the individual user power measurements, the lumped power measurements, and the RoT estimate $$y_{SC,i}^{P,Sc}(t) = x_{SC,i}^{P,Sc}(t) + e_{SC,i}^{P,Sc}(t), i = 1, \ldots, N$$

$$y_{SC,i}^{P,UnSc}(t) = x_{SC,i}^{P,UnSc}(t) + e_{SC,i}^{P,UnSc}(t), i = 1, \ldots, N$$

$$y_{SC}^{RTWP}(t) = x_{SC}^{RTWP}(t) + e_{SC}^{RTWP}(t)$$

$$y_{SC}^{RSEPS}(t) = x_{SC}^{RSEPS}(t) + e_{SC}^{RSEPS}(t)$$

$$y_{SC}^{RoT}(t) = x_{SC}^{RoT}(t) + e_{SC}^{RoT}(t)$$

The final complicating factor of the scheduling problem that requires modeling is the constraints. These can be divided into control signal constraints and state constraints.

Control Signal Constraints
  These constraints include
  The absolute grant $$0 \leq r_{SC,i}^A(t) \leq G_{max,i}^A, i = 1, \ldots, N$$

The step size of the absolute grant, i.e. rate limitation handling $$\Delta G_{min}^A \leq f^A(r_{SC,i}^A(r), u_{SC,i}^A(t)) \leq \Delta G_{max}^A$$

State Constraints

These constraints include:

The transmitted absolute grant $$0 \leq u_{SC,i}^{A}(t) \leq G_{max,i}^{A}, i=1,\ldots,N$$

The transmitted relative grant $$0 \leq u_{SC,i,c}^{R}(t) \leq G_{max,i,c}^{R}, i=1,\ldots,N, c=1,\ldots,N_C$$

The predicted load, with respect to stability. In the equation, hats indicate predictions used for scheduling, whereas other quantities are estimates.

$$0 \leq \hat{x}_{SC}^{L,Stability}(t+1) = x_{SC}^{L,Stability}(t) + \hat{x}_{SC}^{L,Sc}(t+1) \leq L_{max}^{Stability}$$

The predicted load, with respect to coverage. This is constrained by a maximal RoT, i.e.

$$0 \leq \hat{x}_{SC}^{L,Coverage}(t+1) =$$

$$x_{SC}^{L,Coverage}(t) + \hat{x}_{SC}^{L,Sc}(t+1) \leq L_{max}^{Coverage} = 1 - \frac{1}{RoT_{max}^{Coverage}}$$

$$0 \leq \hat{x}_{SC}^{L,Sc}(t+1) - x_{SC}^{L,Sc}(t) \leq \frac{1}{x_{SC}^{Rot}(t-T^{Decode})} - \frac{1}{RoT_{max}^{Coverage}}$$

Figure 4A:
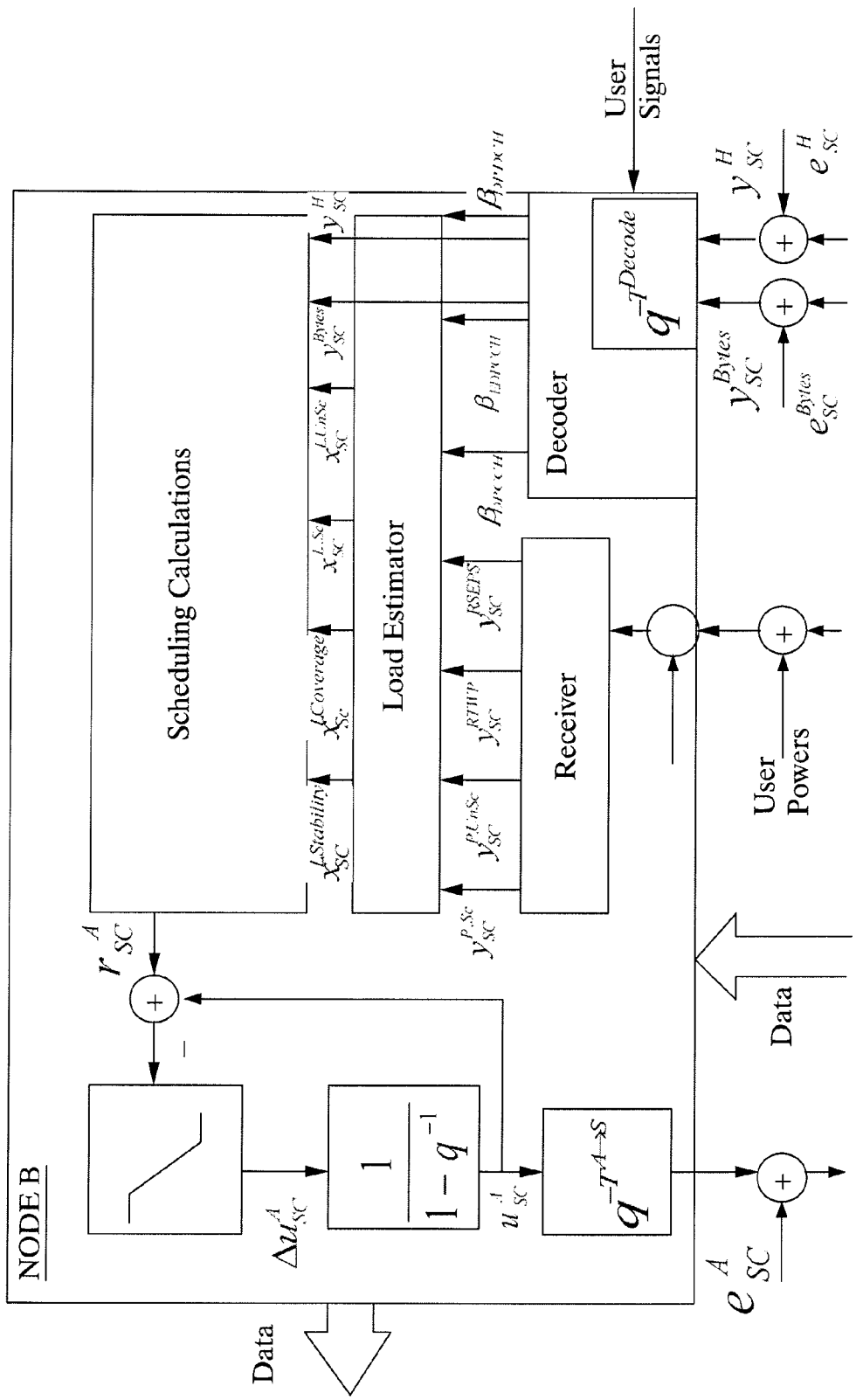
FIG. 4a-4b is a schematic block diagram of an embodiment of an arrangement according to the present invention.
Figure 4B:
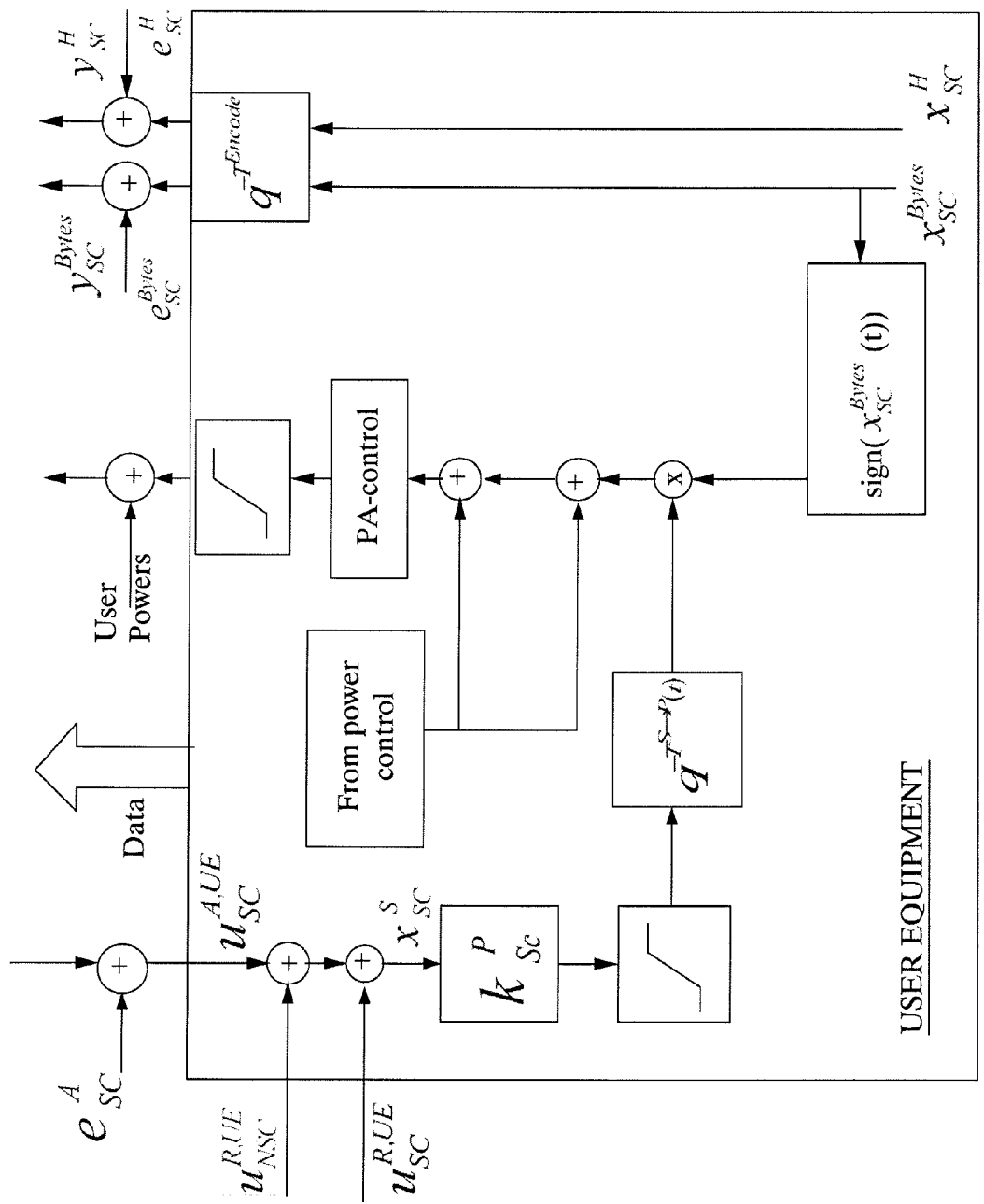

FIG. 4a and FIG. 4b show a block diagram of the scheduling loop with the signaled quantities indicated By inclusion of relevant subsets of dynamic state models, measurement models and constraints according to the above, a dynamic state space model of the following standard form can now be built up $$x(t+1) = f(x(t), u(t, T)) + w(t)$$

$$y(t) = h(x(t), u(t, T)) + e(t)$$

$$0 \leq g(x(t), u(t, T))$$

Here x(t) denotes the state vector, u(t) denotes the control signal vector, T denotes a vector of delays, w(t) denotes a system disturbance, y(t) denotes the measurements, and e(t) denotes the measurement disturbance. Furthermore, f(,), h( )and g(,) are functions built up from the dynamic models defined above.

MPC Control for EUL Scheduling

MPC control is now introduced by using the state space model of the previous subsection, together with a generalized version of (2) and (3). The complete problem, at one specific point in time, can then be stated as follows.

$$u^{*}(t) = \underset{u(t,T)}{\operatorname{argmin}} J(y(t), u(t, T), r(t))$$

subject to $$x(t+1) = f(x(t), u(t, T)) + w(t)$$

$$y(t) = h(x(t), u(t, T)) + e(t)$$

$$0 \leq g(x(t), u(t, T))$$

By selection of different sets or subsets of states, inputs, outputs and constraints, e.g. listed above, it is possible to define several different MPC problems for solution of the WCDMA EUL scheduling problem. This selection also allows a tradeoff between accuracy and performance at one hand, and computational complexity to arrive at the solution in real time. The solution of the optimization problem, is best addressed by selection of a suitable algorithm from the vast literature of MPC and optimization, see e.g. [5] and the references therein.

As should be clear from the above discussion, the MPC solutions to the scheduling problem can be made to account for inter- and intra-cell interactions.

disturbances including fast fading, slow fading, lost packets and random traffic behaviour.

constraints including quantization, absolute grants, relative grants, power constraints, stability constraints and coverage constraints.

Delays including computation times, transmission times and buffer delays, these being allowed to be time variant.

The optimization strategies may include relaxation strategies for quantized inputs.

Figure 5:
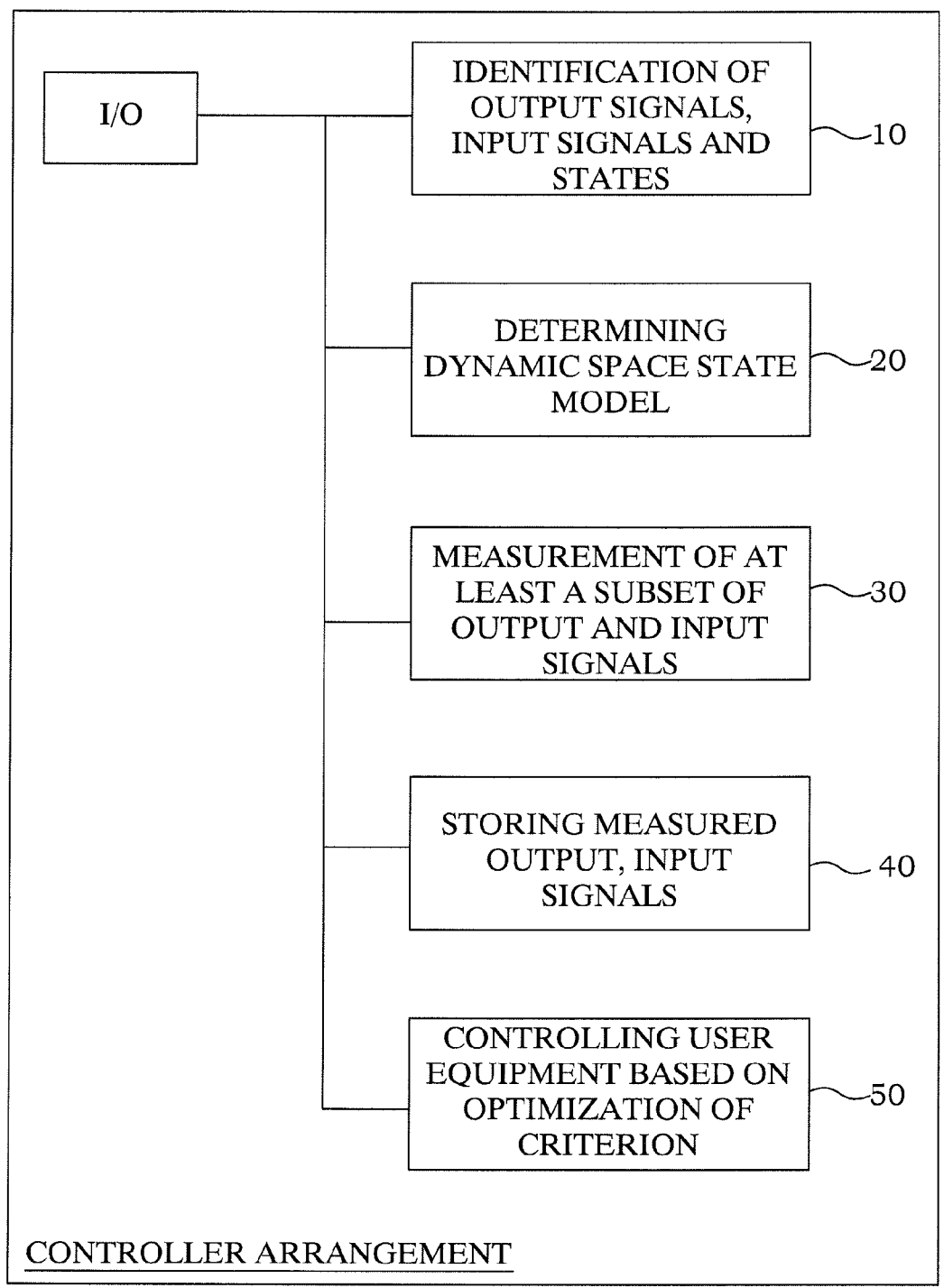
FIG. 5 is a further schematic block diagram of an embodiment of an arrangement according to the present invention

With reference to FIG. 5, an embodiment of a control arrangement according to the present invention will be described.

The arrangement is typically implemented in a radio base station e.g. Node B in a telecommunication system. However, it is also possible for specific systems, to have an arrangement that is distributed between multiple nodes in the system. For simplicity reasons, the arrangement will be described as a single unit. The arrangement includes all necessary equipment for enabling receiving and processing any parameters needed for the execution of the invention. In addition to the specific sections dedicated for the workings of the invention, the arrangement includes a generic input/output unit I/O for input and output signals to and from the arrangement. The arrangement includes an identifier unit 10 for identification of output signals, input signals and system states for the scheduling loop. Further, the arrangement includes a determining unit 20 for determining a dynamic space state model for the scheduling loop based on the identified signals and states. In addition, the arrangement includes a measurement unit 30 for measuring at least a subset of the identified output and input signals, and a storage unit 40 for storing the measured signals. Finally, the arrangement includes a controller unit 50 for controlling the scheduling of the plurality of user equipment in the system based on optimization of a criterion dependent of the measured output and input signals and the dynamic space state model.

The arrangement is further adapted to enable all functionality of the earlier described method of controlling the scheduling loop in the telecommunication system.

Advantages of the present invention and embodiments thereof are:

Enhanced cell capacity for EUL.

Increased stability margins, reducing the risk of power rushes for EUL.

Increased cell coverage for EUL.

Better control of cell instability, reducing the risk for power rushes.

Systematic ways of tuning performance characteristics like scheduling bandwidth with respect to stability of the loop.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] E. Dahlman, S. Parkvall, J. Sköld and P. Beming. 3G Evolution—HSPA and LTE for Mobile Broadband, Oxford, UK. 2007.
[2] T. Wigren, Method and arrangement for memory-efficient estimation of noise floor, International patent application, P22298, 2006-09-25
[3] T. Wigren, Soft algorithms for uplink load estimation, International patent application, P20736, 2005-08-26.
[4] Aström, Introduction to Stochastic Control Theory, New York, Academic Press, 1970.
[5] G. C. Goodwin, M. M. Seron and J. A. De Doná, Constrained Control and Estimation, Springer Verlag 2004.

The invention claimed is:

1. A method of uplink scheduling control in a telecommunication system comprising a node and a plurality of associated user equipment, said method comprising:
identifying scheduling loop output signals, scheduling loop input signals, and scheduling loop system states, wherein the scheduling loop input signals comprise an absolute power grant reference, an absolute power grant control, and a relative power grant control;
determining a dynamic space state model representative of a scheduling loop in said system, based on at least a subset of said identified scheduling loop output and input signals and said scheduling loop system states;
measuring at least a subset of said identified scheduling loop output signals and said identified scheduling loop input signals;
storing said measured scheduling loop input signals, and said measured scheduling loop output signals; and
controlling said plurality of user equipment of said scheduling loop based on optimization of a criterion dependent on said determined dynamic space state model, said stored scheduling loop input signals, and said stored scheduling loop output signals;
wherein said determined dynamic space state model comprises a combination of dynamic state models, measurement models, and constraints.

2. The method of claim 1, further comprising estimating said scheduling loop system states from at least one of said dynamic space state model, said stored scheduling loop input signals, and said stored scheduling loop output signals.

3. The method of claim 1, wherein said identified scheduling loop system states comprise at least one of serving grant, uplink cell load, uplink powers/SIRs, transmitted UE resources, rate requests, and load measures.

4. The method of claim 3, wherein the transmitted UE resources comprise at least a subset of absolute grant and relative grant as generated in a Node B.

5. The method of claim 4, wherein said UE rate requests comprise at least a subset of happy bit and scheduled information as seen in the user equipment.

6. The method of claim 5, wherein the load measures comprise at least a subset of cell coverage, stability, scheduled and unscheduled.

7. The model of claim 1, wherein said determined dynamic space state model represents an air interface uplink load for said system.

8. The method of claim 1, wherein said identified or measured scheduling loop output signals comprise one or more parameters affecting a radio interface load.

9. The method of claim 1, wherein said constraints comprise control signal constraints and state constraints.

10. A method of uplink scheduling control in a telecommunication system comprising a node and a plurality of associated user equipment, said method comprising:
identifying scheduling loop output signals, scheduling loop input signals, and scheduling loop system states;
determining a dynamic space state model representative of a scheduling loop in said system, based on at least a subset of said identified scheduling loop output and input signals and said scheduling loop system states;
measuring at least a subset of said identified scheduling loop output signals and said identified scheduling loop input signals;
storing said at least a subset of said measured scheduling loop input signals, and said measured scheduling loop output signals; and
controlling said plurality of user equipment of said scheduling loop based on optimization of a criterion dependent on said determined dynamic space state model, said stored scheduling loop input signal, and said stored scheduling loop output signals;
wherein said determined dynamic space state model comprises a combination of dynamic state models, measurement models, and constraints;
wherein said constraints comprise control signal constraints and state constraints; and
wherein said control signal constraints comprise at least a subset of absolute grant and step size of absolute grant.

11. The method of claim 10, wherein said state constraints comprise at least a subset of transmitted absolute grant, transmitted relative grant, predicted load with respect to stability, predicted load with respect to coverage.

12. A method of uplink scheduling control in a telecommunication system comprising a node and a plurality of associated user equipment, said method comprising:
identifying scheduling loop output signals, scheduling loop input signals, and scheduling loop system states;
determining a dynamic space state model representative of a scheduling loop in said system, based on at least a subset of said identified scheduling loop output and input signals and said scheduling loop system states;
measuring at least a subset of said identified scheduling loop output signals and said identified scheduling loop input signals;
storing said at least a subset of said measured scheduling loop input signals, and said measured scheduling loop output signals; and
controlling said plurality of user equipment of said scheduling loop based on optimization of a criterion dependent on said determined dynamic space state model, said stored scheduling loop input signal, and said stored scheduling loop output signals;
wherein said system model comprises:

$$x(t+1)=f(x(t),u(t,T))+w(t)$$

$$y(t)=h(x(t),u(t,T))+e(t)$$

$$0 \leq g(x(t),u(y,T)),$$

where $x(t)$ denotes the state vector, $u(t)$ denotes the control signal vector, $T$ denotes a vector of delays, $w(t)$ denotes a system disturbance, $y(t)$ denotes the measurements and $e(t)$ denotes the measurement disturbance, $f(\ )$ $h(\ )$ and $g(\ )$ are functions based on dynamics of the system.

13. The method of claim 12, wherein said optimization step comprises solving the problem $$u^*(t) = \underset{u(t,T)}{\mathrm{argmin}} J(y(t), u(t, T), r(t))$$

subject to $$x(t+1) = f(x(t), u(t, T)) + w(t)$$

$$y(t) = h(x(t), u(t, T)) + e(t)$$

$$0 \leq g(x(t), u(t, T))$$

where J represents said criterion, and r(t) represents a setpoint sequence.

14. The method of claim 13, wherein the solution of said optimization problem is obtained by any model predictive control technique.

15. A controller arrangement for controlling scheduling of user equipment in a telecommunication system, said controller arrangement configured to:

an identifier unit configured to identify scheduling loop output signals, scheduling loop input signals, and scheduling loop system states, wherein the scheduling loop input signals comprise an absolute power grant reference, an absolute power grant control, and a relative power grant control;

a determining unit configured to determine a dynamic space state model representative of a scheduling loop in said system, based on at least a subset of said identified scheduling loop output and input signals and scheduling loop system states;

a measurement unit configured to measure at least a subset of said scheduling loop output signals and said scheduling loop input signals;

a storing unit configured to store said measured scheduling loop input signals, and said measured scheduling loop output signals; and a controller unit configured to control said plurality of user equipment of said scheduling loop based on optimization of a criterion dependent on said determined dynamic space state model, said stored scheduling loop input signals, and said stored scheduling loop output signals;

wherein said determined dynamic space state model comprises a combination of dynamic state models, measurement models, and constraints.

* * * * *

UNITED STATES PATENT AND TRADEMARK OFFICE
CERTIFICATE OF CORRECTION

PATENT NO. : 8,902,835 B2  
APPLICATION NO. : 13/514822  
DATED : December 2, 2014  
INVENTOR(S) : Goodwin et al.

Page 1 of 1

It is certified that error appears in the above-identified patent and that said Letters Patent is hereby corrected as shown below:

On the Title Page, item [73], please replace "Ericcson" with --Ericsson--.

Signed and Sealed this  
Twenty-fourth Day of March, 2015

Michelle K. Lee  
*Director of the United States Patent and Trademark Office*